US00RE36140E

United States Patent [19]

Taguchi et al.

[11] E Patent Number: Re. 36,140

[45] Reissued Date of Patent: Mar. 9, 1999

[54] TWO-PART ADHESIVE

[75] Inventors: Koichi Taguchi; Kinpei Iwata; Hideki Matsudo, all of Shibukawa, Japan

[73] Assignee: Denki Kagaku Kogyo Kabushiki Kaisha, Tokyo, Japan

[21] Appl. No.: 609,006

[22] Filed: Feb. 29, 1996

Related U.S. Patent Documents

Reissue of:

[64] Patent No.: 5,328,947
Issued: Jul. 12, 1994
Appl. No.: 996,137
Filed: Dec. 23, 1992

[30] Foreign Application Priority Data

Dec. 27, 1991 [JP] Japan ..... 3-359238

[51] Int. Cl.[6] ..... C09J 1/00; C09J 4/02; C09J 4/06; C09J 175/04

[52] U.S. Cl. ..... 524/850; 524/853; 524/854; 524/278; 524/287; 525/297; 525/301; 525/302; 525/303; 525/305; 525/309; 525/310; 525/454; 526/274; 526/301; 526/309; 526/317.1; 526/318.4; 526/318.41; 526/318.42; 526/318.43; 526/318.44; 526/320; 526/323.1; 526/323.2; 526/328; 526/328.5

[58] Field of Search ..... 156/331.1, 332; 428/355; 524/507, 533, 547, 549, 553, 558, 807, 811, 832, 833; 525/278, 287, 297, 301, 302, 303, 305, 309, 310, 454; 526/227, 270, 274, 309, 318.4, 320, 328.5

[56] References Cited

U.S. PATENT DOCUMENTS 3,720,656 3/1973 Manaka et al. .
3,890,407 6/1975 Briggs, Jr. et al. .
4,096,201 6/1978 Kishi et al. .
4,174,311 11/1979 Nakano et al. .
4,223,115 9/1980 Zalucha et al. .
4,259,462 3/1981 Nakano et al. .
4,331,795 5/1982 Ukita et al. .
4,414,257 11/1983 Haraga et al. .
4,452,944 6/1984 Dawdy .
4,539,382 9/1985 Omura et al. .
4,546,125 10/1985 Okamoto et al. .
5,318,998 6/1994 Taguchi et al. .
5,328,947 7/1994 Taguchi et al. .
5,330,844 7/1994 Taguchi et al. .

FOREIGN PATENT DOCUMENTS 56-95967 8/1956 Japan .

OTHER PUBLICATIONS

Union Carbide Product Data, "Drying Liquids With Union Carbide Molecular Sieves", 4 pages (date unknown).

Database WPI, Derwent Publication, AN-84-161078/26 (1984).

*Primary Examiner*—Mark Naguno
*Attorney, Agent, or Firm*—Oblon, Spivak, McClelland, Maier & Neustadt, P.C.

[57] ABSTRACT

A two-part adhesive consisting of a first liquid comprising 100 parts by weight of a polymerizable vinyl monomer and from 0.1 to 20 parts by weight of an organic peroxide and a second liquid comprising 100 parts by weight of a polymerizable vinyl monomer and from 0.05 to 15 parts by weight of a reducing agent, wherein either one or both of the first and second liquids contain from 0.4 to 5% by weight of water, and the content of water is more than 0.2% by weight based on the total amount of the first and second liquids.

61 Claims, No Drawings

TWO-PART ADHESIVE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an adhesive. More particularly, it relates to a two-part adhesive having water incorporated.

2. Discussion of Background

There is an increasing demand for adhesives which can be cured in a short period of time at room temperature, from the viewpoint of energy saving, labor saving, saving of resources, etc.

Heretofore, as room temperature quick-curing adhesives, a two-part type quick-curing epoxy adhesive, an anaerobic adhesive, an α-cyanoacrylate adhesive and a second generation acrylic adhesive (SGA) have been known.

The two-part type quick-curing epoxy adhesive is designed to be used in such a manner that a main agent and a curing agent are measured, mixed and coated on an object to be bonded, whereupon the main agent and the main components of the curing agent will react for curing. If the measurement and mixing of the main agent and the curing agent are inadequate, the two-part type quick-curing epoxy adhesive tends to undergo a substantial deterioration in the strength. Further, even if the measurement and mixing are conducted adequately, it still has a drawback that it is poor in the peel strength and impact strength.

The above-mentioned anaerobic adhesive is cured by shutting off air by pressing the adhesive composition between the objects to be bonded. Therefore, at the time of bonding, the adhesive is likely to be pressed out from the objects, and the adhesive at the portion which is in contact with air, will not be cured. Further, it has a drawback that it will not be cured also in a case where the clearance between the objects to be bonded, is large.

The above-mentioned α-cyanoacrylate adhesive provides excellent operation efficiency, but it has low peel strength and impact strength and is poor in the moisture resistance and water resistance. Thus, it has a disadvantage that its useful range is very much limited.

The above-mentioned second generation acrylic adhesive (SGA) is a two-part type. However, it has excellent operation efficiency in that it is unnecessary to accurately measure the two liquids, and it is capable of being cured quickly in from a few minutes to a few tens minutes by extremely rough measurement and mixing (in some cases, merely by contacting the two liquids). Yet, it provides high peel strength and impact strength, and curing of the portion pressed out of the objects to be bonded, is excellent. Therefore, an adhesive of this type has been widely used.

Such SGA is disclosed in e.g. U.S. Pat. Nos. 3,890,407 and 4,096,201. However, it has a drawback that it does not provide adequate adhesiveness to a metal object.

With respect to improvement of the adhesiveness of SGA to a metal, U.S. Pat. Nos. 4,233,115 and 4,452,944 and Japanese Unexamined Patent Publication No. 84964/1984 disclose that the adhesiveness to a metal object can be improved by an addition of a monomer of a phosphoric acid ester type. However, even such improvement is not yet adequate with respect to the improvement of the adhesiveness to iron or stainless steel, and it has been found that the adhesiveness to such a metal object tends to be poor, and the bond strength tends to deteriorate.

SUMMARY OF THE INVENTION

The present invention has been made in view of such prior art, and it is an object of the present invention to provide an adhesive having particularly excellent adhesiveness to metals.

The present inventors have conducted extensive studies, and as a result, surprisingly have found that an adhesive having water incorporated among conventional non-aqueous adhesives where the presence of water has been avoided as far as possible, is capable of achieving the object. The present invention has been accomplished on the basis of this discovery.

The present invention provides a two-part adhesive consisting of a first liquid comprising 100 parts by weight of a polymerizable vinyl monomer and from 0.1 to 20 parts by weight of an organic peroxide and a second liquid comprising 100 parts by weight of a polymerizable vinyl monomer and from 0.05 to 15 parts by weight of a reducing agent, wherein either one or both of the first and second liquids contain from 0.4 to 5% by weight of water, and the content of water is more than 0.2% by weight based on the total amount of the first and second liquids.

DETAILED DESCRIPTION OF THE PREFERRED EMBODIMENTS

Now, the present invention will be described in further detail.

The polymerizable vinyl monomer useful in the present invention may be any radically polymerizable vinyl monomer or a combination of two or more radically polymerizable vinyl monomers. Among them, a liquid or solid (meth) acrylate or (meth)acrylic acid is preferred. Specific examples are as follows:

① A monomer of the formula $Z—O—R_1$ wherein Z is a (meth)acryloyl group, $CH_2=CHCOOCH_2—CH(OH)CH_2—$ or $CH_2=C(CH_3)COOCH_2—CH(OH)CH_2—$, and $R_1$ is H, a $C_{1-20}$ alkyl group, a cycloalkyl group, a benzyl group, a phenyl group, a tetrahydrofurfuryl group, a glycidyl group, a dicyclopentyl group, a dicyclopentenyl group or a (meth)acryloyl group.

Such a monomer may, for example, be (meth)acrylic acid, methyl (meth)acrylate, cyclohexyl (meth)acrylate, benzyl (meth)acrylate, tetrahydrofuryl (meth)acrylate, dicyclopentyl (meth)acrylate, dicyclopentenyl (meth)acrylate, glycerol (meth)acrylate or glycerol di(meth)acrylate.

② A monomer of the formula $Z—O—(R_2O)_p—R_1$, wherein Z and $R_1$ are as defined above, $R_2$ is $—C_2H_4—$, $—C_3H_6—$, $$—CH_2\underset{\underset{CH_3}{|}}{CH}—,$$

$—C_4H_8—$ or $—C_6H_{12}—$, and p is an integer of from 1 to 25.

Such a monomer may, for example, be 2-hydroxyethyl (meth)acrylate, 2-hydroxypropyl (meth)acrylate, ethoxyethyl (meth)acrylate, polyethylene glycol (meth)acrylate, phenoxyethyl (meth)acrylate, dicyclopentenyloxyethyl (meth)acrylate, phenoxydiethylene glycol (meth)acrylate, tripropylene glycol di(meth)acrylate or 1,6-hexanediol di(meth)acrylate.

③ A monomer of the formula:

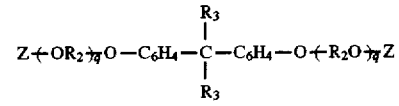

wherein Z and $R_2$ are as defined above, $R_3$ is H or a $C_{1-4}$ alkyl group, and q is an integer of from 0 to 8.

Such a monomer may, for example, be 2,2-bis(4-meth) acryloxyphenyl)propane, 2,2-bis(4-meth) acryloxyethoxyphenyl)propane, 2,2-bis(4-(meth) acryloxydiethoxyphenyl)propane, 2,2-bis(4-(meth) acryloxypropoxyphenyl)propane and 2,2-bis(4-(meth) acryloxytetraethoxyphenyl)propane.

④ A (meth)acrylate of a polyhydric alcohol not included in the above monomers ①, ② and ③.

Such a monomer may, for example, be trimethylolpropane tri(meth)acrylate, neopentyl glycol di(meth)acrylate, pentaerythritol tetra(meth)acrylate and dipentaerythritol hexa (meth)acrylate.

⑤ A urethane prepolymer having (meth)acryloyloxy groups.

Such a prepolymer is obtainable, for example, by reacting a (meth)acrylate having a hydroxyl group, an organic polyisocyanate and a polyol.

Here, the (meth)acrylate having a hydroxyl group may, for example, be hydroxyethyl (meth)acrylate, hydroxypropyl (meth)acrylate or hydroxybutyl (meth)acrylate.

The organic polyisocyanate may, for example, be toluene diisocyanate, 4,4-diphenylmethane diisocyanate, hexamethylene diisocyanate or isophorone diisocyanate.

The polyol may, for example, be polyethylene glycol, polypropylene glycol, polytetramethylene glycol or polyester polyol.

⑥ An acidic phosphoric acid compound of the following formula (I) or its amine salt:

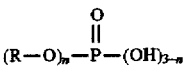

(I)

wherein R is $CH_2{=}CR_4CO(OR_5)_m$— (wherein $R_4$ is H or $CH_3$, $R_5$ is $—C_2H_4—$, $—C_3H_6—$,

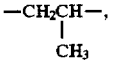

$—C_4H_8—$, $—C_6H_{12}—$ or

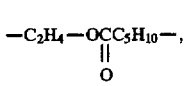

and m is an integer of from 1 to 10) and n is 1 or 2.

Specific examples of the acidic phosphoric acid of the formula (I) or its amine salt include acid phosphooxyethyl (meth)acrylate, acid phosphooxypropyl (meth)acrylate and bis(2(meth)acryloyloxyethyl)phosphate, and amine salts thereof.

The above monomers ①, ②, ③, ④, ⑤ and ⑥ may be used alone or in combination of two or more of them.

The amount of the (meth)acrylate to be used, is preferably at least 70% by weight based on the total weight of the polymerizable vinyl monomers to be used, in view of the curing speed, etc.

As polymerizable vinyl monomers other than (meth) acrylate, styrene, α-alkylstyrene, divinylbenene, vinyl ether, divinyl ether, N-vinylpyrrolidone, 2-vinylpyridine and a vinyl ester (such as vinyl acetate or vinyl propionate) may, for example, be mentioned.

Further, to the adhesive of the present invention, polymerizable substances other than polymerizable vinyl monomers may be incorporated. As such substances, polycarboxylic acids having polymerizable unsaturated bonds (such as maleic acid, maleic anhydride, fumaric acid, itaconic acid, itaconic anhydride and citraconic acid) and polymerizable olefinic hydrocarbons having at least 6 carbon atoms, may, for example, be mentioned.

When such polymerizable substances other than the polymerizable vinyl monomers, are to be used, their proportion is preferably less than 30% by weight based on the total amount of the polymerizable vinyl monomers. Such substances may be used alone or in combination as a mixture of two or more of them.

The Organic peroxide to be used for the first liquid of the present invention, may, for example, be cumene hydroperoxide, p-menthane hydroperoxide, tert-butyl hydroperoxide, diisopropylbenzene dihydroperoxide, methyl ethyl ketone peroxide, benzoyl peroxide or tert-butyl peroxybenzoate. However, the organic peroxide is not limited to such specific examples.

The amount of the organic peroxide is usually from 0.1 to 20 parts by weight per 100 parts by weight of the polymerizable vinyl monomer. If the amount is less than 0.1 part by weight, the curing speed tends to be slow, and if it exceeds 20 parts by weight, the storage stability tends to be poor.

The reducing agent to be used for the second liquid of the present invention may be any conventional reducing agent so long as it is capable of reacting with the above organic peroxide to generate radicals. As typical reducing agents, a tertiary amine, a thiourea derivative and a metal salt may, for example, be mentioned. The tertiary amine may, for example, be triethylamine, tripropylamine, tributylamine or N,N-dimethylparatoluidine. The thiourea derivative may, for example, be 2-mercaptobenzimidazole, methylthiourea, dibutylthiourea, tetramethylthiourea or ethylenethiourea. The metal salt may, for example, be cobalt naphthenate, copper naphthenate or vanadyl acetyl acetone.

The amount of the reducing agent is usually from 0.05 to 15 parts by weight per 100 parts by weight of the polymerizable vinyl monomer.

The adhesive of the present invention is characterized in that either one or both of the first and second liquids contain from 0.4 to 5% by weight of water, and the content of water is more than 0.2% by weight, preferably from 0.4 to 5% by weight, based on the total amount of the first and second liquids. If the water content is not more than 0.2% by weight, no adequate effect for improvement of the adhesiveness will be obtained. On the other hand, if the water content exceeds 5% by weight, water may sometimes be separated.

Substances such as polymerizable vinyl monomers used in the present invention usually contain water in an amount of 0.2% by weight or less as an impurity. In the present invention, water is added so that either one or both of the first and second liquids have a water content of from 0.4 to 5% by weight, and the water content in the liquid obtained by mixing the two liquids is more than 0.2% by weight, preferably from 0.4 to 5% by weight, to adjust the content of water.

There is no particular restriction as to the water to be used in the present invention. For example, the water may be commonly available water or purified water (such as distilled water, deionized water, deaerated water or water obtained by precise filtration). Further, it may be water containing a polymer substance (such as polyvinyl pyrrolidone, polyethylene oxide, an alkyl cellulose or polyvinyl alcohol), or water containing a surfactant. Furthermore, it may be water in the form of an aqueous synthetic resin emulsion or rubber latex.

Water may be incorporated by an optional method. It is common to employ a method of adding water during the preparation of the first liquid, the second liquid or a mixture thereof. However, water may be preliminarily incorporated to substances to be used, such as the polymerizable vinyl monomers, the organic peroxide and the reducing agent. To incorporate water uniformly, a conventional stirrer, line mixer or mixing-type coating machine may, for example, be employed.

In the present invention, an elastomer component to improve the peel strength and the impact strength may be added to the adhesive. As such an elastomer component, various synthetic rubbers such as nitrile-butadiene rubber and chlorosulfonated polyethylene may be mentioned.

Further, for the purpose of adjusting the viscosity and fluidity, a thermoplastic polymer such as a methyl methacrylate-butadiene-styrene, copolymer (MBS) or linear polyurethane, or fine silica powder, may also be employed.

In order to facilitate the curing of the portion which is in contact with air, various waxes may be added to the adhesive of the present invention.

Further, for the purpose of improving the storage stability, known substances such as various polymerization inhibitors or antioxidants may be incorporated. Further, a plasticizer, a filler, a coloring agent, a rust preventive agent or the like may also be added, as the case requires.

There is no particular restriction as to the type of the material of objects to be bonded by means of the adhesive of the present invention, and the adhesive of the present invention exhibits particularly excellent adhesive effects when used for bonding objects having a metal surface.

Now, the present invention will be described in further detail with reference to Examples and Comparative Examples. In the following Examples and Comparative Examples, the proportions of the respective materials are shown by parts by weight.

EXAMPLE 1 and COMPARATIVE EXAMPLE 1

Various materials and water (deionized water) were mixed in the proportions as identified in Table 1 to obtain an adhesive consisting of the first and second liquids having the water contents as identified in Table 1. On one side of a test specimen (200×25×1.2 mm, non-treated SPCC-D), the first liquid was coated, and on one side of another test specimen (200×25×0.4 mm, non-treated SPCC-D), the second liquid was coated. Immediately, the coated surfaces were put together and bonded, followed by aging at room temperature for 24 hours to obtain a test sample for measuring the peel strength. The peel strength (unit: kg/25 mm) of the test sample was measured in accordance with ISO 4578-1979 (crosshead speed: 100 mm/min) at 23° C. under a relative humidity of 50%. The results are shown also in Table 1.

The water contents of the first and second liquids were measured by means of a moisture measuring apparatus CA-03 Model (manufactured by Mitsubishi Kasei Corporation). To make the adhesive layer thickness uniform, glass beads having a particle size of 100 μm were added in a very small amount to the first liquid.

EXAMPLES 2 to 5 and COMPARATIVE EXAMPLES 2 and 3

Various materials and water (deionized water) were mixed in the proportions as identified in Table 2 to obtain an adhesive consisting of the first and second liquids having the water contents as identified in Table 2. As test specimens, a stainless steel sheet (non-treated SUS304) of 200×25×1.5 mm and a stainless steel sheet (non-treated SUS304) of 200×25×0.5 mm were used. The first and second liquids were mixed in equal amounts by weight, and the mixture was immediately coated on one side of each test specimen, and the coated surfaces were bonded to each other, followed by aging at room temperature for 24 hours to obtain a test sample for measuring the peel strength. The peel strength (unit: kg/25 mm) of the test sample was measured in the same manner as in Example 1. The results are shown also in Table 2.

Further, to make the adhesive layer thickness uniform, glass beads having a particle size of 100 μm were added in a very small amount to each of the first and second liquids before mixing.

EXAMPLES 6 and COMPARATIVE EXAMPLE 4

Various materials and water (deionized water) were mixed in the proportions as identified in Table 3 to obtain an adhesive consisting of the first and second liquids having the water contents as identified in Table 3. Test samples were prepared in the same manner as in Example 2, and the peel strength (unit: kg/25 mm) of a test sample was measured in the same manner as in Example 2 except that the obtained first and second liquids were used, and the following combinations (1) and (2) of test specimens were used. The results are also shown in Table 3.

Combination (1) of test specimens: Cold rolled steel sheets (non-treated SPCC-D) of 200×25×1.2 mm and 200×25×0.4 mm.

Combination (2) of test specimens: Stainless steel sheets (non-treated SUS304) of 200×25×1.5 mm and 200×25×0.5 mm.

TABLE 1

| | Example 1 | Comparative Example 1 |
|---|---|---|
| First liquid | | |
| N-220SH | 16 | 16 |
| MMA | 50.4 | 50.4 |
| 2HEMA | 33.6 | 33.6 |
| P-56 | 0.5 | 0.5 |
| CHP | 5 | 5 |
| MEHQ | 0.2 | 0.2 |
| Water content (wt %) | 2 | 0.2 |
| Second liquid | | |
| N-220SH | 16 | 16 |
| MMA | 50.4 | 50.4 |
| 2HEMA | 33.6 | 33.6 |
| P-56 | 0.5 | 0.5 |
| ETU | 1.5 | 1.5 |
| Water content (wt %) | 2 | 0.2 |
| SPCC/SPCC | | |
| Peel strength | 9.1 | 2.9 |
| State of fracture | Cohesive failure | Adhesive failure (Interfacial peel) |

N-220SH: Acrylonitrile-butadiene rubber (manufactured by Japan Synthetic Rubber Co., Ltd.)
MMA: Methyl methacrylate
2HEMA: 2-hydroxyethyl methacrylate
P-56: Paraffin (mp: 56° C.)
CHP: Cumene hydroperoxide
MEHQ: Hydroquinone monomethyl ether
ETU: Ethylene thiourea

TABLE 2

| | Example 2 | Example 3 | Example 4 | Example 5 | Comparative Example 2 | Comparative Example 3 |
|---|---|---|---|---|---|---|
| First liquid | | | | | | |
| N-220SH | 16 | 16 | 16 | 16 | 16 | 16 |
| MMA | 50.4 | 50.4 | 50.4 | 50.4 | 50.4 | 50.4 |
| 2HEMA | 33.6 | 33.6 | 33.6 | 33.6 | 33.6 | 33.6 |
| P-56 | 0.5 | 0.5 | 0.5 | 0.5 | 0.5 | 0.5 |
| CHP | 5 | 5 | 5 | 5 | 5 | 5 |
| MEHQ | 0.2 | 0.2 | 0.2 | 0.2 | 0.2 | 0.2 |
| Water content (wt %) | 0.5 | 2 | 5 | 5 | 0.02 | 6 |
| Second liquid | | | | | | |
| N-220SH | 16 | 16 | 16 | 16 | 16 | 16 |
| MMA | 50.4 | 50.4 | 50.4 | 50.4 | 50.4 | 50.4 |
| 2HEMA | 33.6 | 33.6 | 33.6 | 33.6 | 33.6 | 33.6 |
| P-56 | 0.5 | 0.5 | 0.5 | 0.5 | 0.5 | 0.5 |
| ETU | 1.5 | 1.5 | 1.5 | 1.5 | 1.5 | 1.5 |
| APEM/EA | 1.0 | 1.0 | 1.0 | 1.0 | 1.0 | 1.0 |
| Water content (wt %) | 0.5 | 2 | 0.05 | 5 | 0.05 | 6 |
| SUS/SUS | | | | | | |
| Peel strength | 13.6 | 17.0 | 16.8 | 13.0 | 10.5 | |
| State of fracture | Cohesive failure but partially interfacial peel | Cohesive failure | Cohesive failure | Cohesive failure but partially interfacial peel | Adhesive failure (Interfacial peel) | Water separated. Not measured. |

Note:
APEM/EA: Ethanolamine salt of acid phosphoxethyl methacrylate (Phosmer MH, trade name, manufactured by Uni Chemical Co., Ltd.)

TABLE 3

| | Example 6 | Comparative Example 4 |
|---|---|---|
| First liquid | | |
| BTA III N2 | 20 | 20 |
| UN-1255TM | 40 | 40 |
| 2HEMA | 40 | 40 |
| MA | 5 | 5 |
| BMOEP | 1 | 1 |
| P-56 | 1 | 1 |
| CHP | 6 | 6 |
| MEHQ | 0.3 | 0.3 |
| Water content (wt %) | 2 | 0.2 |
| Second liquid | | |
| BTA III N2 | 20 | 20 |
| UN-1255TM | 40 | 40 |
| 2HEMA | 40 | 40 |
| MA | 5 | 5 |
| BMOEP | 1 | 1 |
| P-56 | 1 | 1 |
| ETU | 2 | 2 |
| Water content (wt %) | 2 | 0.2 |
| SPCC/SPCC | | |
| Peel strength | 13.9 | 8.7 |
| State of fracture | Cohesive failure | Adhesive failure (Interfacial peel) |
| SUS/SUS | | |
| Peel strength | 14.2 | 9.3 |
| State of fracture | Cohesive failure | Adhesive failure (Interfacial peel) |

TABLE 3-continued

BTA III N2: MBS (manufactured by Kurcha Chemical Industries Ltd.), UN-1255TM: Aromatic polyester modified urethane prepolymer (Artresin UN-1255TM, manufactured by Nogami Kogyo K.K.). MA: Malic acid, BMOEP: Bis(methacryloyloxyethyl)phosphase The two-part adhesive of the present invention is excellent in the adhesiveness particularly to a metal material, and its industrial usefulness is significant.

What is claimed is:

1. A two-part adhesive consisting of a first liquid comprising 100 parts by weight of at least one polymerizable vinyl monomer and from 0.1 to 20 parts by weight of an organic peroxide and a second liquid comprising 100 parts by weight of at least one polymerizable vinyl monomer and from 0.05 to 15 parts by weight of a reducing agent, wherein either one or both of the first and second liquids contain from 0.4 to 5% by weight of water, and the content of water is more than 0.2% by weight based on the total amount of the first and second liquids wherein at least one of the polymerizable vinyl monomers in each of the first and second liquids is a (meth)acrylate.

2. The adhesive according to claim 1, wherein the content of water is from 0.4 to 5% by weight based on the total amount of the first and second liquids.

3. The adhesive according to claim 1, wherein at least 70% by weight of the polymerizable vinyl monomer in each of the first and second liquids is a (meth)acrylate.

4. The adhesive according to claim 1, wherein from 0.1 to 10% by weight of the polymerizable vinyl monomer in each of the first and second liquids is a polymerizable acidic phosphoric acid compound of the following formula (I) or its amine salt:

$$(R-O)_n-\overset{\overset{\displaystyle O}{\|}}{P}-(OH)_{3-n} \quad (I)$$

wherein R is $CH_2{=}CR_4CO(OR_5)_m$— (wherein $R_4$ is H or $CH_3$, $R_5$ is —$C_2H_4$—, —$C_3H_6$—, $$-CH_2\underset{\underset{\displaystyle CH_3}{|}}{CH}-,$$

—$CH_4H_8$—, —$C_6H_{12}$— or $$-C_2H_4-\underset{\underset{\displaystyle O}{\|}}{OCC_5H_{10}}-,$$

and m is an integer of from 1 to 10) and n is 1 or 2.

5. The adhesive according to claim 1, wherein at least one of the polymerizable vinyl monomers in each of the first and second liquids is (meth)acrylic acid.

6. The adhesive according to claim 3, wherein said (meth)acrylate is selected from the group consisting of methyl (meth)acrylate, cyclohexyl (meth)acrylate, benzyl (meth)acrylate, tetrahydrofuryl (meth)acrylate, dicyclopentyl (meth)acrylate, dicyclopentenyl (meth)acrylate, glycerol (meth)acrylate, and glycerol di(meth)acrylate.

7. The adhesive according to claim 4, wherein n is 1.

8. The adhesive according to claim 4, wherein n is 2.

9. The adhesive according to claim 4, wherein at least 70% by weight of the polymerizable vinyl monomer is a (meth)acrylate.

10. The adhesive according to claim 1, wherein each of the first and second liquids further comprises paraffin.

11. The adhesive according to claim 1, wherein each of the first and second liquids further comprises a thermoplastic polymer selected from the group consisting of a methyl methacrylate-butadiene-styrene copolymer and a linear polyurethane.

12. The adhesive according to claim 1, wherein each of the first and second liquids further comprises an elastomer selected from the group consisting of a nitrile-butadiene rubber and chlorosulfonated polyethylene.

*13. A cured adhesive having a water content of more than 0.2% by weight, prepared by mixing and aging for 24 hours a two-part adhesive consisting of a first liquid comprising 100 parts by weight of at least one polymerizable vinyl monomer and from 0.1 to 20 parts by weight of an organic peroxide and a second liquid comprising 100 parts by weight of at least one polymerizable vinyl monomer wherein either one or both of the first and second liquids contain from 0.4 to 5% by weight of water, and from 0.05 to 15 parts by weight of a reducing agent, wherein at least one of the polymerizable vinyl monomers in each of said first and, second liquids is a (meth)acrylate, and wherein said water content of more than 0.2% by weight is based on the total amount of the first and second liquids.*

*14. The cured adhesive according to claim 13, wherein at least 70% by weight of the polymerizable vinyl monomer in each of the first and second liquids is a (meth)acrylate.*

*15. The cured adhesive as claimed in claim 13, wherein from 0.1 to 10% by weight of the polymerizable vinyl monomer in each of the first and second liquids is a polymerizable acidic phosphoric acid compound of the following formula (I) or its amine salt:*

$$(R-O)_n-\overset{\overset{\displaystyle O}{\|}}{P}-(OH)_{3-n} \quad (I)$$

*wherein R is $CH_2 = CR_3CO(OR_5)_m$ — wherein $R_4$ is H or $CH_3$, $R_5$ is $-C_2H_4-$, $-C_3H_6-$*

$$-CH_2\underset{\underset{\displaystyle CH_3}{|}}{CH}-,$$

*$-C_4H_8-$, $-C_6H_{12}-$ or*

$$-C_2H_4-O-\overset{\overset{\displaystyle O}{\|}}{C}-C_5H_{10}-,$$

*and m is an integer of from 1 to 10 and n is 1 or 2.*

*16. The cured adhesive as claimed in claim 13, wherein at least one of the polymerizable vinyl monomers in each of the first and second liquids is (meth)acrylic acid.*

*17. The cured adhesive as claimed in claim 13, wherein said (meth)acrylate is selected from the group consisting of methyl (meth)acrylate, cyclohexyl (meth)acrylate, benzyl (meth)acrylate, tetrahydrofuryl (meth)acrylate, dicyclopentyl (meth)acrylate, dicyclopentenyl (meth)acrylate, glycerol (meth)acrylate, and glycerol di(meth)acrylate.*

*18. The cured adhesive according to claim 15, wherein n is 1.*

*19. The cured adhesive according to claim 15, wherein n is 2.*

*20. The cured adhesive according to claim 15, wherein at least 70% by weight of the polymerizable vinyl monomer is a (meth)acrylate.*

*21. The cured adhesive according to claim 13, wherein each of the first and second liquids further comprises paraffin.*

*22. The cured adhesive according to claim 13, wherein each of the first and second liquids further comprises a thermoplastic polymer selected from the group consisting of a methyl methacrylate-butadiene-styrene copolymer and a linear polyurethane.*

*23. The cured adhesive according to claim 13, wherein each of the first and second liquids further comprises an elastomer selected from the group consisting of a nitrile-butadiene rubber and chlorosulfonated polyethylene.*

*24. An article comprising a surface coated with the cured adhesive of claim 13.*

*25. An article comprising a surface coated with the cured adhesive of claim 14.*

*26. An article comprising a surface coated with the cured adhesive of claim 15.*

*27. An article comprising a surface coated with the cured adhesive of claim 16.*

*28. An article comprising a surface coated with the cured adhesive of claim 17.*

*29. An article comprising a surface coated with the cured adhesive of claim 18.*

*30. An article comprising a surface coated with the cured adhesive of claim 19.*

*31. An article comprising a surface coated with the cured adhesive of claim 20.*

*32. An article comprising a surface coated with the cured adhesive of claim 21.*

*33. An article comprising a surface coated with the cured adhesive of claim 22.*

*34. An article comprising a surface coated with the cured adhesive of claim 23.*

*35. An article comprising a surface coated with the cured adhesive of claim 13, wherein said surface is a metal surface.*

*36. A process for bonding two surfaces together, comprising the steps of mixing the first and second liquids of the two-part adhesive of claim 1 together, applying the mixed liquids to said surfaces to be bonded together, and bonding said surfaces together followed by aging said mixed liquids for 24 hours.*

*37. A process for bonding two surfaces together, comprising the steps of mixing the first and second liquids of the two-part adhesive of claim 2 together, applying the mixed liquids to said surfaces to be bonded together, and bonding said surfaces together followed by aging said mixed liquids for 24 hours.*

*38. A process for bonding two surfaces together, comprising the steps of mixing the first and second liquids of the two-part adhesive of claim 3 together, applying the mixed liquids to said surfaces to be bonded together, and bonding said surfaces together followed by aging said mixed liquids for 24 hours.*

*39. A process for bonding two surfaces together, comprising the steps of mixing the first and second liquids of the two-part adhesive of claim 4 together, applying the mixed liquids to said surfaces to be bonded together, and bonding said surfaces together followed by aging said mixed liquids for 24 hours.*

*40. A process for bonding two surfaces together, comprising the steps of mixing the first and second liquids of the two-part adhesive of claim 5 together, applying the mixed liquids to said surfaces to be bonded together, and bonding said surfaces together followed by aging said mixed liquids for 24 hours.*

*41. A process for bonding two surfaces together, comprising the steps of mixing the first and second liquids of the two-part adhesive of claim 6 together, applying the mixed liquids to said surfaces to be bonded together, and bonding said surfaces together followed by aging said mixed liquids for 24 hours.*

*42. A process for bonding two surfaces together, comprising the steps of mixing the first and second liquids of the two-part adhesive of claim 7 together, applying the mixed liquids to said surfaces to be bonded together, and bonding said surfaces together followed by aging said mixed liquids for 24 hours.*

*43. A process for bonding two surfaces together, comprising the steps of mixing the first and second liquids of the two-part adhesive of claim 8 together, applying the mixed liquids to said surfaces to be bonded together, and bonding said surfaces together followed by aging said mixed liquids for 24 hours.*

*44. A process for bonding two surfaces together, comprising the steps of mixing the first and second liquids of the two-part adhesive of claim 9 together, applying the mixed liquids to said surfaces to be bonded together, and bonding said surfaces together followed by aging said mixed liquids for 24 hours.*

*45. A process for bonding two surfaces together, comprising the steps of mixing the first and second liquids of the two-part adhesive of claim 10 together, applying the mixed liquids to said surfaces to be bonded together, and bonding said surfaces together followed by aging said mixed liquids for 24 hours.*

*46. A process for bonding two surfaces together, comprising the steps of mixing the first and second liquids of the two-part adhesive of claim 11 together, applying the mixed liquids to said surfaces to be bonded together, and bonding said surfaces together followed by aging said mixed liquids for 24 hours.*

*47. A process for bonding two surfaces together, comprising the steps of mixing the first and second liquids of the two-part adhesive of claim 12 together, applying the mixed liquids to said surfaces to be bonded together, and bonding said surfaces together followed by aging said mixed liquids for 24 hours.*

*48. The process as claimed in claim 36, wherein at least one of said surfaces is metal.*

*49. A process for bonding two surfaces together, comprising the steps of separately applying the first and second liquids of the two-part adhesive of claim 1 to first and second surfaces to be bonded, respectively, bonding said surfaces together such that said first and second liquids contact one another, followed by aging for 24 hours.*

*50. A process for bonding two surfaces together, comprising the steps of separately applying the first and second liquids of the two-part adhesive of claim 2 to first and second surfaces to be bonded, respectively, bonding said surfaces together such that said first and second liquids contact one another, followed by aging for 24 hours.*

*51. A process for bonding two surfaces together, comprising the steps of separately applying the first and second liquids of the two-part adhesive of claim 3 to first and second surfaces to be bonded, respectively, bonding said surfaces together such that said first and second liquids contact one another, followed by aging for 24 hours.*

*52. A process for bonding two surfaces together, comprising the steps of separately applying the first and second liquids of the two-part adhesive of claim 4 to first and second surfaces to be bonded, respectively, bonding said surfaces together such that said first and second liquids contact one another, followed by aging for 24 hours.*

*53. A process for bonding two surfaces together, comprising the steps of separately applying the first and second liquids of the two-part adhesive of claim 5 to first and second surfaces to be bonded, respectively, bonding said surfaces together such that said first and second liquids contact one another, followed by aging for 24 hours.*

*54. A process for bonding two surfaces together, comprising the steps of separately applying the first and second liquids of the two-part adhesive of claim 6 to first and second surfaces to be bonded, respectively, bonding said surfaces together such that said first and second liquids contact one another, followed by aging for 24 hours.*

*55. A process for bonding two surfaces together, comprising the steps of separately applying the first and second liquids of the two-part adhesive of claim 7 to first and second surfaces to be bonded, respectively, bonding said surfaces together such that said first and second liquids contact one another, followed by aging for 24 hours.*

*56. A process for bonding two surfaces together, comprising the steps of separately applying the first and second liquids of the two-part adhesive of claim 8 to first and second surfaces to be bonded, respectively, bonding said surfaces together such that said first and second liquids contact one another, followed by aging for 24 hours.*

*57. A process for bonding two surfaces together, comprising the steps of separately applying the first and second liquids of the two-part adhesive of claim 9 to first and second surfaces to be bonded, respectively, bonding said surfaces together such that said first and second liquids contact one another, followed by aging for 24 hours.*

*58. A process for bonding two surfaces together, comprising the steps of separately applying the first and second liquids of the two-part adhesive of claim 10 to first and second surfaces to be bonded, respectively, bonding said surfaces together such that said first and second liquids contact one another, followed by aging for 24 hours.*

*59. A process for bonding two surfaces together, comprising the steps of separately applying the first and second*

*liquids of the two-part adhesive of claim 11 to first and second surfaces to be bonded, respectively, bonding said surfaces together such that said first and second liquids contact one another, followed by aging for 24 hours.*

*60. A process for bonding two surfaces together, comprising the steps of separately applying the first and second liquids of the two-part adhesive of claim 12 to first and second surfaces to be bonded, respectively, bonding said surfaces together such that said first and second liquids contact one another, followed by aging for 24 hours.*

*61. The process as claimed in claim 49, wherein at least one of said surfaces is metal.*

* * * * *